US011216050B2

(12) United States Patent
Lee et al.

(10) Patent No.: US 11,216,050 B2
(45) Date of Patent: Jan. 4, 2022

(54) METHOD OF POWER MANAGEMENT AND APPARATUS FOR POWER MANAGEMENT

(71) Applicant: RAZER (ASIA-PACIFIC) PTE. LTD., Singapore (SG)

(72) Inventors: Kah Yong Lee, Singapore (SG); Chee Oei Chan, Singapore (SG); Rafael Raymund Viernes, Singapore (SG); Pierre Zeloon Lye, Singapore (SG)

(73) Assignee: RAZER (ASIA-PACIFIC) PTE. LTD., Singapore (SG)

(*) Notice: Subject to any disclaimer, the term of this patent is extended or adjusted under 35 U.S.C. 154(b) by 0 days.

(21) Appl. No.: 16/762,554

(22) PCT Filed: Nov. 10, 2017

(86) PCT No.: PCT/SG2017/050563
§ 371 (c)(1),
(2) Date: May 8, 2020

(87) PCT Pub. No.: WO2019/093962
PCT Pub. Date: May 16, 2019

(65) Prior Publication Data
US 2020/0341527 A1    Oct. 29, 2020

(51) Int. Cl.
*G06F 1/00* (2006.01)
*G06F 1/26* (2006.01)
(Continued)

(52) U.S. Cl.
CPC ............ *G06F 1/266* (2013.01); *G06F 1/3296* (2013.01); *G06F 3/03543* (2013.01); *G06N 20/00* (2019.01); *G06F 2203/0384* (2013.01)

(58) Field of Classification Search
CPC combination set(s) only.
See application file for complete search history.

(56) References Cited

U.S. PATENT DOCUMENTS 6,661,410 B2    12/2003    Casebolt et al.
6,859,196 B2    2/2005    Kehlstadt
(Continued)

FOREIGN PATENT DOCUMENTS

JP    2003194528 A    7/2003

OTHER PUBLICATIONS

International Search Report and Written Opinion, dated Jul. 23, 2018, for the corresponding International Application No. PCT/SG2017/050563 in 10 pages.
(Continued)

*Primary Examiner* — Nitin C Patel
(74) *Attorney, Agent, or Firm* — Polsinelli PC

(57) ABSTRACT

A method, a computer-readable medium, and an apparatus for power management are provided. The apparatus may determine an activation distance based on operator behavior in relation to operating the apparatus. The apparatus may detect the presence of an approaching operator at the activation distance. The apparatus may wake up from a low-power state in response to the detecting of the presence of the approaching operator at the activation distance. The apparatus may determine a deactivation distance based on the operator behavior. The apparatus may detect the presence of a departing operator of the apparatus at the deactivation distance. The apparatus may enter into the low-power state in response to the detecting of the presence of the departing operator at the deactivation distance.

16 Claims, 9 Drawing Sheets

(51) Int. Cl.
*G06N 20/00* (2019.01)
*G06F 1/3296* (2019.01)
*G06F 3/0354* (2013.01)

(56) References Cited

U.S. PATENT DOCUMENTS

| | | |
|---|---|---|
| 7,995,034 B2 | 8/2011 | Pope et al. |
| 8,743,083 B2 | 6/2014 | Zanone et al. |
| 9,367,146 B2 | 6/2016 | Piot et al. |
| 9,542,014 B1 | 1/2017 | Sundara-Rajan |
| 9,560,522 B2 | 1/2017 | Smith et al. |
| 2004/0155860 A1 | 8/2004 | Wenstrand et al. |
| 2004/0221183 A1* | 11/2004 | Lu ................. G06F 3/03543 713/300 |
| 2005/0024501 A1 | 2/2005 | Ellenby et al. |
| 2008/0136792 A1 | 6/2008 | Peng et al. |
| 2010/0060579 A1 | 3/2010 | Huang |
| 2010/0066679 A1* | 3/2010 | Pan ................. G06F 1/3259 345/166 |
| 2011/0312349 A1* | 12/2011 | Forutanpour ........... G06F 1/163 455/466 |
| 2013/0019205 A1 | 1/2013 | Gil et al. |
| 2014/0075230 A1* | 3/2014 | Suggs ................. H02J 7/35 713/323 |
| 2015/0149956 A1 | 5/2015 | Kempinski et al. |
| 2016/0246353 A1 | 8/2016 | Bostick |

OTHER PUBLICATIONS

Extended European Search Report dated Nov. 9, 2020, 20 pages, for the corresponding European Patent Application No. 17931205.3.

\* cited by examiner

METHOD OF POWER MANAGEMENT AND APPARATUS FOR POWER MANAGEMENT

TECHNICAL FIELD

Various aspects of this disclosure generally relate to human-computer interaction, and more particularly, to zero latency input devices.

BACKGROUND

Computing technology has seen a many-fold increase in capability ever since it was created. Processors work at ever higher rates; memories are ever larger and always faster; mass storage is larger and cheaper every year. Computers now are essential elements in many aspects of life, and are often used to present three-dimensional worlds to users, in everything from games to scientific visualization.

Human-computer interaction (HCI) researches the design and use of computer technology, focused on the interfaces between humans (users) and computers. Humans interact with computers in many ways. The interface between humans and computers is crucial to facilitating this interaction. The interface between the user and the computer has not seen the same rate of change as the computing technology. For example, screen windows, keyboard, monitor, and mouse are the standard, and have seen little change since their introduction. Little thought is given to the human-computer interface, although most of the user's experience with the computer is dominated by the interface between the user and the computer.

Some battery-operated input devices (e.g., mouse, keyboard) may enter into a low power state (e.g., a sleep/standby state) to save battery power. An input device in the sleep/standby condition must wait for an interrupt before the device can wake up. Thus, there will be some latency on the input device before the input device can be used to provide input to a computing device (e.g., a desktop computer, a game console) coupled to the input device. For example, a corded or cordless mouse in the market is not able to achieve immediate sensor movement response when the mouse is in sleep or standby state.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Most of the corded and cordless input devices (e.g., mouse, keyboard, game controller, or joystick controller) in the market are not able to achieve immediate response or operation when the input device is in sleep or standby state. The objective of this disclosure is to provide ultra-low power management for an input device while not compromising the performance of the input device. An anticipated wake up may be triggered upon the hand of a user approaching the input device. The input device in a low-power state may detect the presence of the hand at a certain distance. Once the hand is detected at the certain distance, the input device may start a power-on sequence so that the input device may be fully operational when the hand touches the input device.

In an aspect of the disclosure, a method, a computer-readable medium, and an apparatus for power management are provided. The apparatus may determine an activation distance based on operator behavior in relation to operating the apparatus. The apparatus may detect the presence of an approaching operator at the activation distance. The apparatus may wake up from a low-power state in response to the detecting of the presence of the approaching operator at the activation distance.

In some embodiments, the apparatus may determine a deactivation distance based on the operator behavior. The apparatus may detect the presence of a departing operator of the apparatus at the deactivation distance. The apparatus may enter into the low-power state in response to the detecting of the presence of the departing operator at the deactivation distance.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1B:
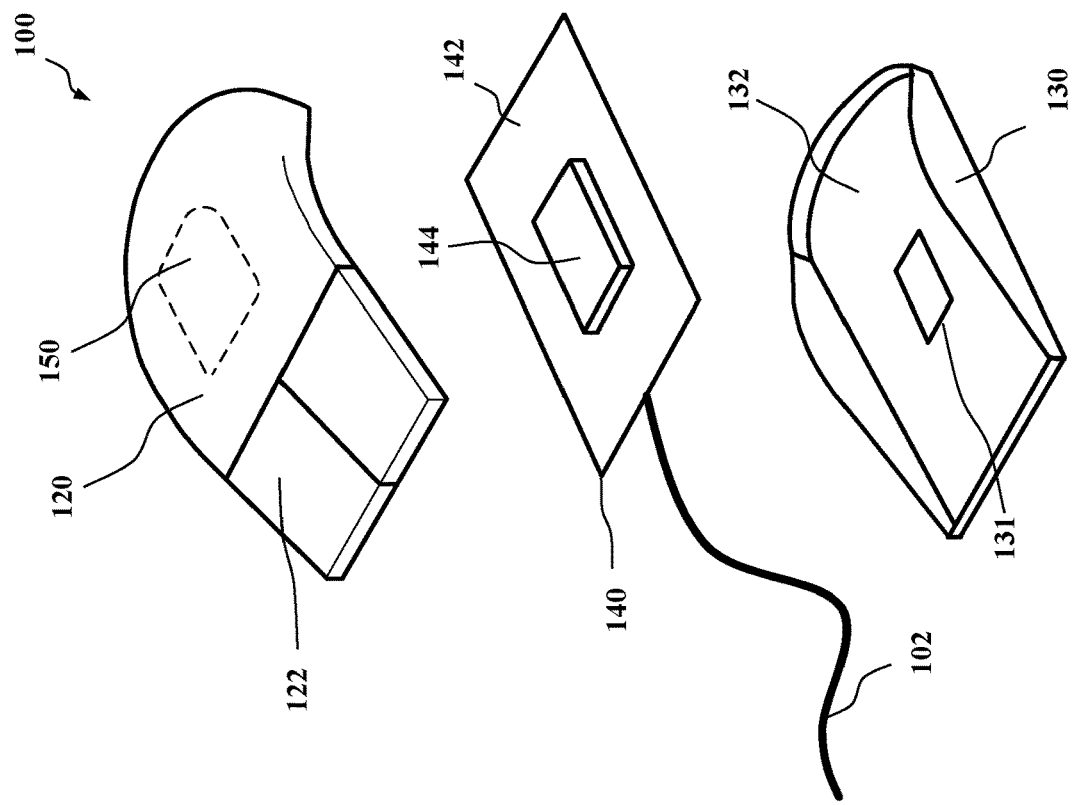
FIG. 1B is a diagram showing an exploded view of the mouse of FIG. 1A according to various embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of power management will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In some embodiments, a new mechanism is provided to resolve the design deficiency (e.g., the reaction time latency when transitioning from a low-power state to being awake) of cordless input devices. As a result of implementing this mechanism, a user may not able to detect any latency caused by the input device transitioning from hibernation to active usage. As human palms exhibit high level of variations when being detected by a sensing mechanism, a novel adaptive method is provided using artificial intelligence (AI) learning on individual user behavior to optimize the reaction timing while compensating variations in sensing parameters such as human hand, velocity, sensing device, etc.

In traditional designs, a cordless mouse transits from active mode to hibernation mode when the mouse is inactive for a period of time. A user has to physically move the mouse or click a button of the mouse in order to trigger the mouse to return to active mode. However, a certain time period is required for the mouse to power up. As a result, the first few mouse moves or clicks by the user is either undetected or detected with a delay.

The new mechanism provided in the disclosure resolves this problem by detecting the palm position of the user. The mouse starts the power-up process once the palm is detected at a certain distance from the mouse. Therefore, the power-up process is started, t seconds, before the palm reaches the mouse. Consequently, the mouse may be ready to operate when the palm touches the mouse.

Similarly, components (e.g., optical sensor, click sensing) of the mouse may be put into hibernation mode when the palm leaves the mouse (e.g., by detecting the distance between the palm and the mouse). The subsystems of the mouse may be turned off when they are not in use. Hence the battery life of the mouse may be maximized.

Within the mouse, the new sensing mechanism may include an integrated capacitive sensor that is coupled to an integrated circuit (IC) circuit. Only a single electrode on the surface of the mouse may be required to perform the sensing function. The IC circuit may be operably connected to a microcontroller (within the mouse) that performs the adaptive functions of the mouse. The adaptive functions may include the machine learning algorithms to perform automatic calibration to achieve optimal reaction performance and optimal battery performance. In some embodiments, an adaptation method is provided to adjust the sensing distance constantly according to user behavior.

In some embodiments, a machine learning algorithm is adopted to automatically calibrate the input device to achieve optimization from past user behavior. The input device may detect changes of user behavior to further optimize reaction time and battery performance. Although the input device of some embodiments may be configured with default settings, the input device may be automatically calibrated through a few samples to ensure that from the time the presence sensor detects the hand to the moment the hand contacts the device, the input device is waken up to be ready for operation to ensure optimal reaction performance.

In some embodiments, ultra-low power consumption may be achieved on sleep/standby mode while improving the performance of the input device upon waking up. Some embodiments may allow practical implementation of such sensing mechanism for mass deployment. In some embodiments, automatic calibration of the input device may be performed to achieve optimal reaction performance time and optimal battery life. Some embodiments may be implemented on corded and cordless mouse and keyboards for efficient power management and performance. Some embodiments may be applied to other devices that have standby mode and have a human touch activation.

Figure 1A:
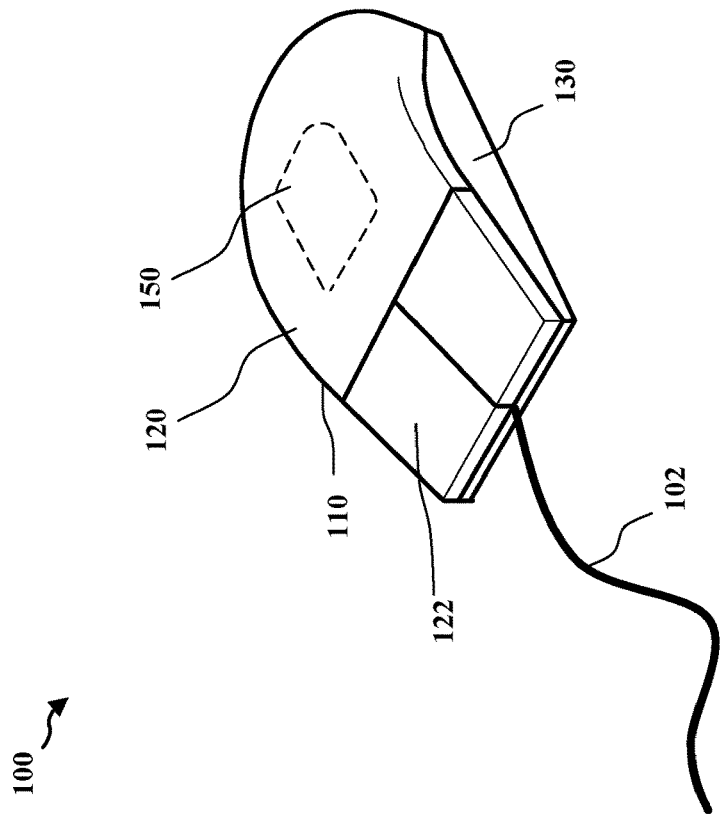
FIG. 1A is a diagram showing an assembled view of a mouse for communication with a processor-based device according to various embodiments.

FIG. 1A is a diagram showing an assembled view of a mouse 100 for communication with a processor-based device according to various embodiments. FIG. 1B is a diagram showing an exploded view of the mouse 100 of FIG. 1A according to various embodiments. As shown, the mouse 100 may include a housing 110. The housing 110 may be an exterior casing of the mouse 100. Further, the housing 110 may include a cover portion 120 and a base portion 130. The cover portion 120 and the base portion 130 may be two separate parts of the housing 110. The cover portion 120 of the housing 110 may be a top case cover of the exterior casing of the mouse 100. The base portion 130 of the housing 110 may be a bottom case cover of the exterior casing of the mouse 100. According to various embodiments, when the cover portion 120 and the base portion 130 are assembled together, the housing 110 may define an inner cavity to house or encase internal components 140 of the mouse 100.

According to various embodiments, the internal components 140 of the mouse 100 may include an electronic circuit module 142 and a motion detection module 144. The electronic circuit module 142 may include printed circuit boards, or any other suitable electronic circuit. The electronic circuit module 142 may be connected to the processor-based device, such as a computer. In some embodiments, the connection to the processor-based device may be realized via a cable 102. In some embodiments, the connection to the processor-based device may be realized wirelessly. In some embodiments, the electronic circuit module 142 may include a microcontroller (not shown) that is capable of performing complex computation and control.

The motion detection module 144 may include optical sensors, or laser sensors, or track ball mechanism, or any other electronic or mechanical components that may be configured to detect movement of the mouse 100. The motion detection module 144 may further be configured to be in communication with the electronic circuit module 142 such that the detected movement of the mouse may be transmitted to the processor-based device, which the mouse 100 may be connected to.

Further, the cover portion 120 of the housing 110 may include one or more buttons 122. The one or more buttons 122 may be configured to interact with the electronic circuit module 142 of the mouse 100 for a user to provide inputs to the processor-based device, to which the mouse 100 may be connected, via clicking of the one or more buttons 122 of the mouse 100. The one or more buttons 122 may include a click button, or a scroll button, or a push button, or any combination of suitable buttons. The one or more buttons 122 may be located at any region of the cover portion 120 as desired.

According to various embodiments, the housing 110 may include a base surface. The base surface may be configured to face a tracking surface on which the mouse 100 may be placed on. Accordingly, the base surface of the housing 110 may be an exterior surface of a substantially flat section 132 of the base portion 130 of the housing 110. Thus, the mouse 100 may be placed with the base surface of the base portion 130 of the housing 110 substantially flat against or substantially parallel to a mouse pad, a table top, or any other suitable tracking surfaces on which the mouse may be used.

According to various embodiments, the base portion 130 of the housing 110 may include a window 131. The window 131 may be an opening or a transparent portion of the base portion 130. Accordingly, the window 131 may allow the motion detection module 144 to detect relative movement between the mouse 100 and the tracking surface on which the mouse 100 may be placed and moved.

In some embodiments, the cover portion 120 of the housing 110 may include a single electrode 150. The electrode 150 may be part of an integrated capacitive sensor, which may be able to sense the presence of an object at a certain distance to the mouse 100. The integrated capacitive sensor may be couple to the electronic circuit module 142. In some embodiments, the integrated capacitive sensor may provide sensing data to the microcontroller within the electronic circuit module 142 for further processing of the sensing data.

Figure 2A:
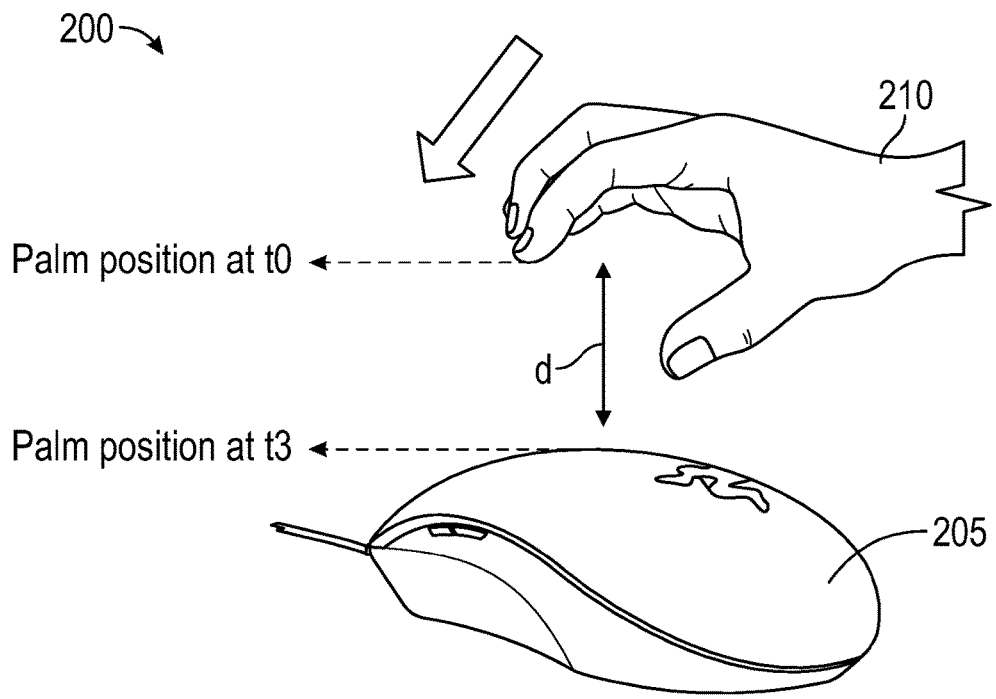
FIG. 2A is a diagram illustrating an example of waking up an input device with zero latency.
Figure 2B:
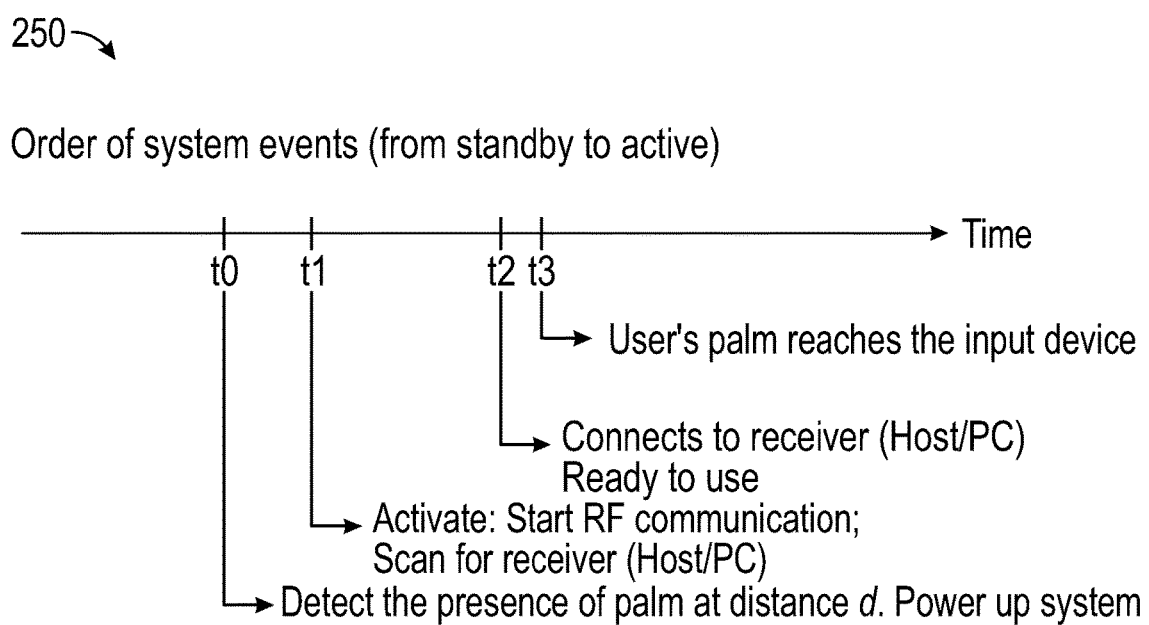
FIG. 2B is a diagram illustrating an order of system events that occur during the waking up of the input device in FIG. 2A.

FIG. 2A is a diagram 200 illustrating an example of waking up an input device 205 with zero latency. FIG. 2B is a diagram 250 illustrating an order of system events that occur during the waking up of the input device 205 in FIG. 2A. The input device 205 may be in a sleep state or a standby state initially.

At time $t_0$, the input device 205 may sense the approaching palm 210 at distance d. Consequently, the input device 205 may power itself up or otherwise switch from the sleep or standby state to an active state.

At time $t_1$, the input device 205 may activate itself. For example, the input device 205 may start radio frequency (RF) communication and scan for a receiver (e.g., a host computing device, a personal computer, etc.).

At time $t_2$, the input device 205 may connect to the receiver and become ready to operate.

At time $t_3$, the approaching palm 210 reaches the input device 205. Because the input device 205 is already ready to operate at time $t_2$, the palm 210 may start to operate the input device 205 immediately without suffering any delay in response from the input device 205.

In one embodiment, the user behavior may be monitored and the optimal sensing distance, d, may be adjusted accordingly. For example, when the input device 205 is in standby mode, it may constantly monitor its activation time. Activation time is the time taken from the detection time ($t_0$) to the time when the palm 210 reaches the input device 205 ($t_3$). The input device 205 may store the value of the activation time into a database and use a sizeable samples of the history to compute the optimal sensing distance, d.

The adaptation of the sensing distance may make use of either the maximum or the average value of activation time based on the power saving policy implemented in the input device. The speed of palm movement, v, may be computed using the selected value of the activation time and the sensing distance, d, at the time the activation time was recorded, as defined below:

$$v = \frac{d}{t}$$

Hence the optimal sensing distance, $d_n$, may be computed using the speed computed and the desired activation time, $t_d$, as defined below:

$$d_n = v \times t_d$$

Once the optimal sensing distance, $d_n$, is obtained, it may become the new sensing distance, d.

Even though a computer mouse is illustrated as the input device in FIGS. 1 and 2A, one of ordinary skill in the art would realize that the input device may be a keyboard, a game controller, a joystick controller, or any other suitable input device. Furthermore, even though the palm 210 is illustrated to operate the input device 205 in FIG. 2A, one of ordinary skill in the art would recognize that the operator of the input device 205 may be another part of the human body, an extension of the human body, an artificial limb, or any suitable equivalent.

Figure 3:
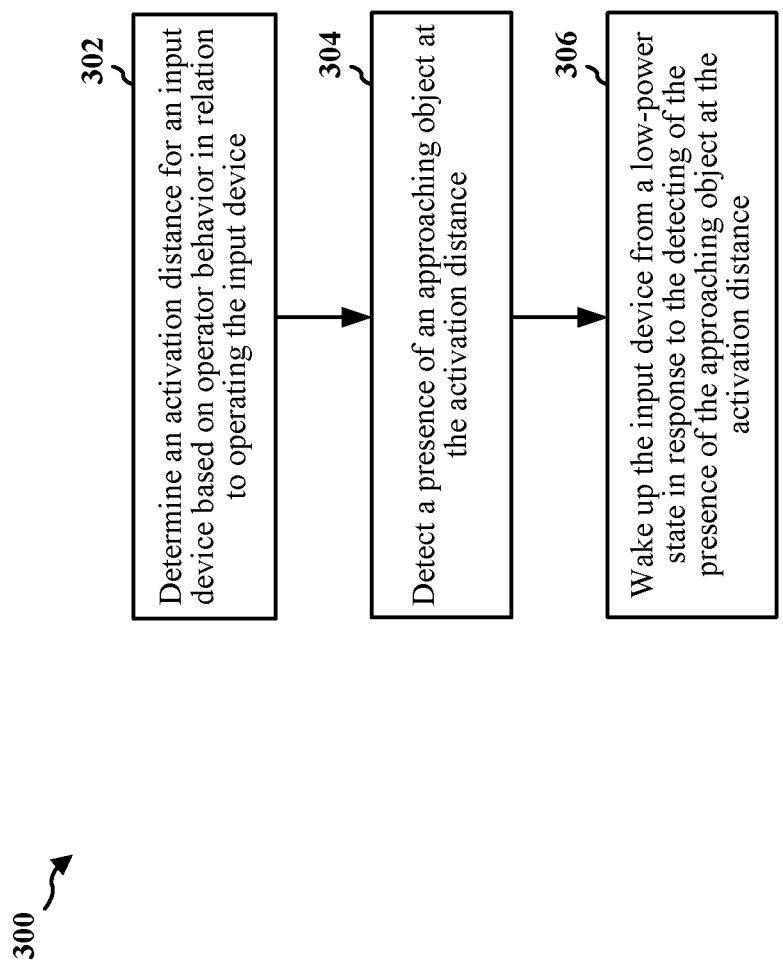
FIG. 3 is a flowchart of a method of power management.

FIG. 3 is a flowchart 300 of a method of power management. In one embodiment, the method may be performed by an apparatus (e.g., the apparatus 802/802'). The apparatus may include an input device (e.g., the mouse 100 or the input device 205). In one embodiment, the apparatus may include a sensing mechanism with a single electrode on the surface of the apparatus. In one embodiment, the apparatus may be one of a mouse, a keyboard, a game controller, or a joystick controller.

At 302, the apparatus may determine an activation distance based on operator behavior in relation to operating the apparatus. In one embodiment, the operator behavior may include historical behavior in relation to operating the apparatus during the latest period of time. The length of the latest period of time may be predetermined. In one embodiment, the operator of the apparatus may be a hand, a palm, another part of the human body, an extension of the human body, an artificial limb, or any suitable equivalent.

In one embodiment, to determine the activation distance, the apparatus may determine an actual activation time based on the operator behavior, and calculate the activation distance based on the actual activation time and a desired activation time. In one embodiment, the actual activation time may be the time taken from detecting a presence of an approaching operator at a previous activation distance to the time when the approaching operator reaches the input device. In one embodiment, to calculate the activation distance, the apparatus may calculate the speed of operator movement based on the actual activation time and the previous activation distance, and calculate the activation distance based on the speed of operator movement and the desired activation time. In one embodiment, the desired activation time may be the duration for the input device to wake up from the low-power state.

At 304, the apparatus may detect a presence of an approaching object at the activation distance. In one embodiment, the presence of the approaching object may be detected by the sensing mechanism of the apparatus.

At 306, the apparatus may wake up from a low-power state in response to the detection of the presence of the approaching object at the activation distance. In one embodiment, the low power state may be one of a standby state, a sleep state, or a hibernate state.

Figure 4:
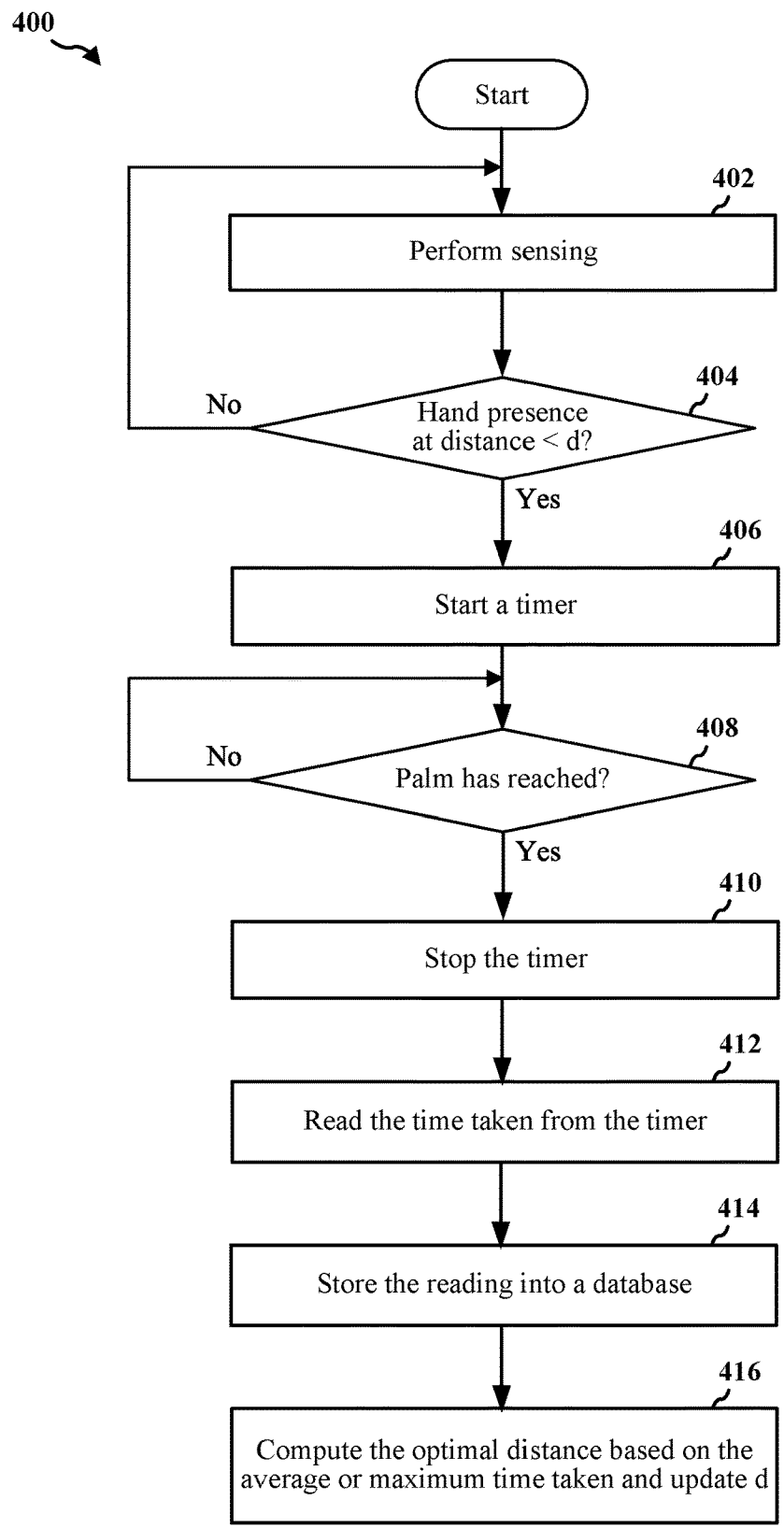
FIG. 4 is a flowchart of a method of adapting the sensing distance for activating the input device.

FIG. 4 is a flowchart 400 of a method of adapting the sensing distance for activating the input device. In one embodiment, the method may be performed by an apparatus (e.g., the apparatus 802/802'). The apparatus may include an input device (e.g., the mouse 100 or the input device 205). In one embodiment, the operations performed in the method may include the operations performed at 302 in FIG. 3.

At 402, the apparatus may perform sensing to detect any approaching hand. At 404, the apparatus may determine whether there is a presence of an approaching hand at a distance that is less than the activation distance. If such a presence of an approaching hand is detected, the apparatus may proceed to 406. Otherwise, the apparatus may loop back to 402 to continue performing sensing.

At 406, the apparatus may start a timer. At 408, the apparatus may determine whether the palm has reached the apparatus. If the palm has reached, the apparatus may proceed to 410. Otherwise, the apparatus may loop back to perform the operation of 408 again.

At 410, the apparatus may stop the timer. At 412, the apparatus may read the time taken from the timer. At 414, the apparatus may store the reading of the timer into a database.

At 416, the apparatus may compute the optimal distance based on the average or maximum time taken and update the sensing distance d accordingly.

Figure 5A:
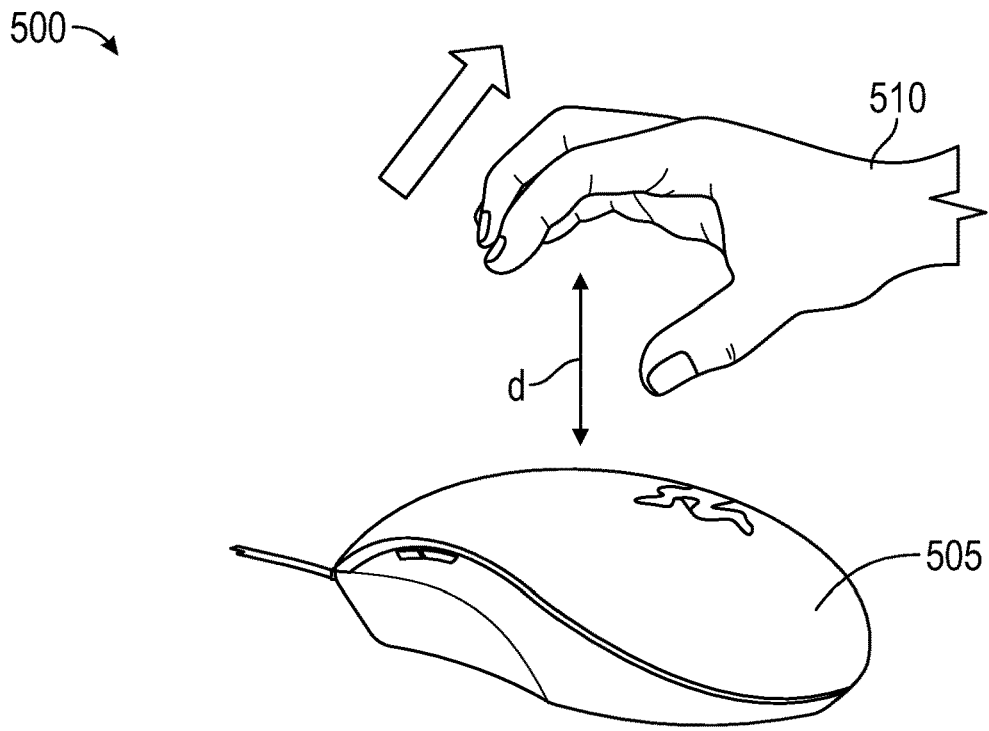
FIG. 5A is a diagram illustrating an example of deactivate an input device to conserve power.
Figure 5B:
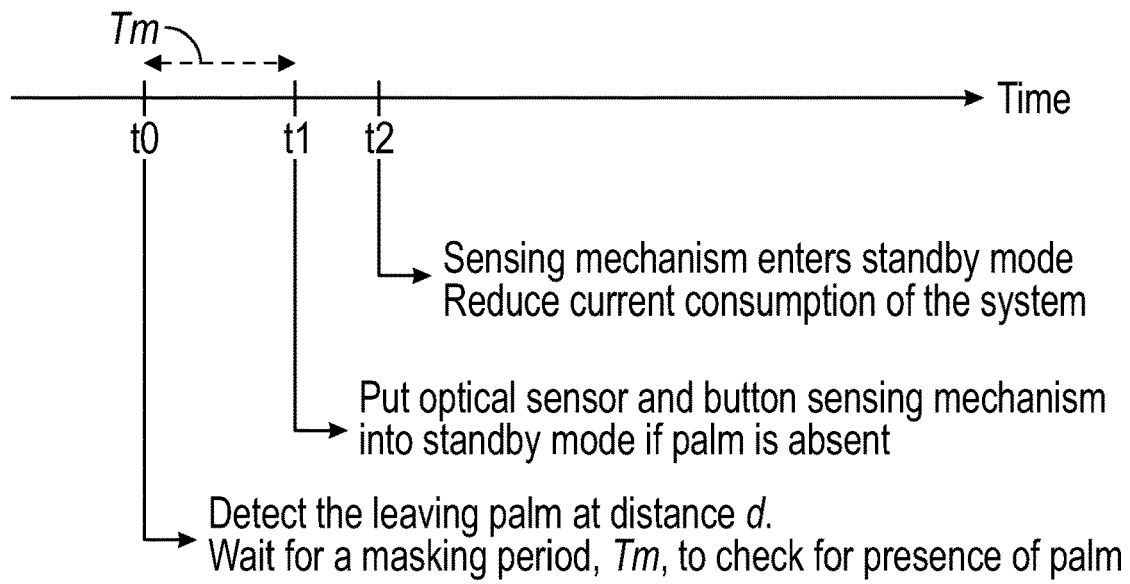
FIG. 5B is a diagram illustrating an order of system events that occur during the deactivation of the input device in FIG. 5A.

FIG. 5A is a diagram 500 illustrating an example of deactivate an input device 505 to conserve power. FIG. 5B is a diagram 550 illustrating an order of system events that occur during the deactivation of the input device 505 in FIG. 5A. The input device 505 may be in an active state initially.

At time $t_0$, the input device 505 may detect the departing palm 510 at distance d. The input device 505 may wait a masking period, $T_m$, to check the presence of the palm 510 to ensure that the palm 510 is not re-approaching the input device 505.

At time $t_1$, the input device 505 may put certain subsystems (e.g., optical sensor, button sensing mechanism) into standby mode if the palm 510 is absent.

At time $t_2$, the input device 505 may put the sensing mechanism into the standby mode to reduce current consumption of the system.

In one embodiment, the user behavior may be monitored and the optimal sensing distance, d, may be adjusted accordingly. For example, when the input device 505 is in active mode, it may constantly monitor the deactivation time. Deactivation time may be the time taken for the palm 510 from the time when the palm 510 leaves the surface of the input device 505 to the time when the palm 510 reaches distance d ($t_0$). The input device 505 may store the value of the deactivation time into a database and use a sizeable samples of the history to compute the optimal distance, d, for deactivation.

The adaptation of the sensing distance for deactivation may make use of either the maximum or the average value of deactivation time based on the power saving policy implemented in the input device. The speed of palm movement, v, may be computed using the selected value of the deactivation time and the sensing distance, d, at the time the deactivation time was recorded, as defined below:

$$v = \frac{d}{t}$$

Hence the optimal sensing distance for deactivation, $d_n$, may be computed using the speed computed and the desired deactivation time, $t_d$, as defined below:

$$d_n = v \times t_d$$

Once the optimal sensing distance for deactivation, $d_n$, is obtained, it may become the new sensing distance for deactivation, d.

Even though a computer mouse is illustrated as the input device in FIG. 5A, one of ordinary skill in the art would realize that the input device may be a keyboard, a game controller, a joystick controller, or any other suitable input device. Furthermore, even though the palm 510 is illustrated to operate the input device 505 in FIG. 5A, one of ordinary skill in the art would recognize that the operator of the input device 505 may be another part of the human body, an extension of the human body, an artificial limb, or any suitable equivalent.

Figure 6:
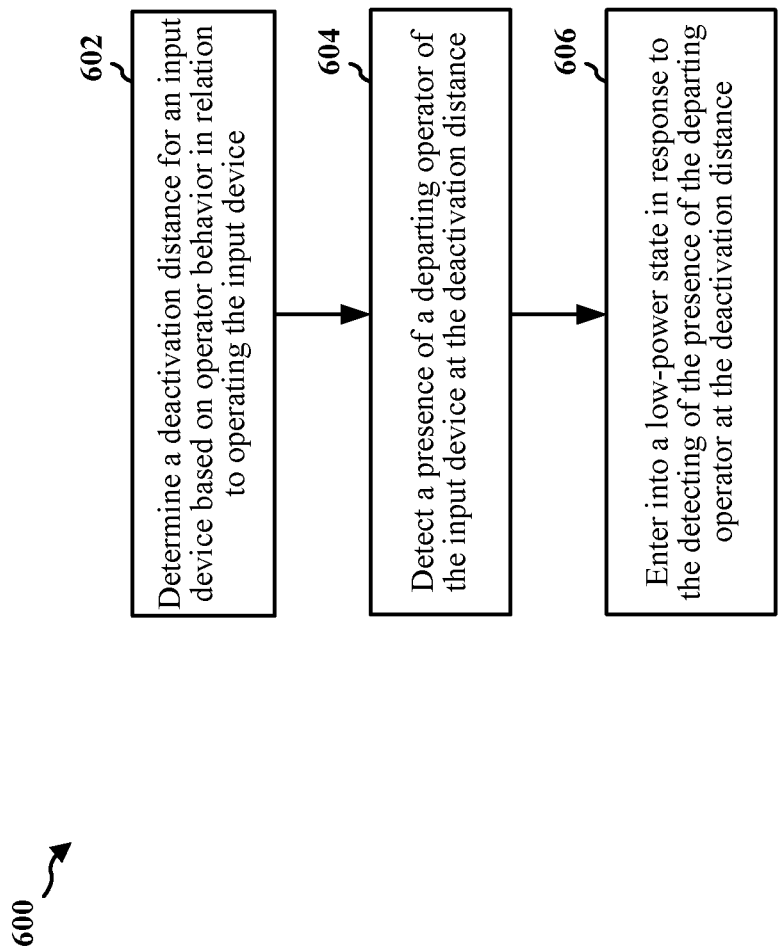
FIG. 6 is a flowchart of a method of power management.

FIG. 6 is a flowchart 600 of a method of power management. In one embodiment, the method may be performed by an apparatus (e.g., the apparatus 802/802'). The apparatus may include an input device (e.g., the mouse 100 or the input device 505). In one embodiment, the apparatus may include a sensing mechanism with a single electrode on the surface of the apparatus. In one embodiment, the apparatus may be one of a mouse, a keyboard, a game controller, or a joystick controller.

At 602, the apparatus may determine a deactivation distance based on operator behavior in relation to operating the apparatus. In one embodiment, the operator behavior may include historical behavior in relation to operating the apparatus during the latest period of time. The length of the latest period of time may be predetermined. In one embodiment, the operator of the apparatus may be a hand, a palm, another part of the human body, an extension of the human body, an artificial limb, or any suitable equivalent.

In one embodiment, to determine the deactivation distance, the apparatus may determine an actual deactivation time based on the operator behavior, and calculate the deactivation distance based on the actual activation time and a desired deactivation time. In one embodiment, the actual deactivation time may be the time taken from the time when a previous departing operator leaves the apparatus to the detection of the presence of the previous departing operator at a previous deactivation distance. In one embodiment, to calculate the deactivation distance, the apparatus may calculate the speed of operator movement based on the actual deactivation time and the previous deactivation distance, and calculate the deactivation distance based on the speed of operator movement and the desired deactivation time.

At 604, the apparatus may detect a presence of a departing operator at the deactivation distance. In one embodiment, the presence of the departing operator may be detected by the sensing mechanism of the apparatus.

At 606, the apparatus may enter into a low-power state in response to the detection of the presence of the departing operator at the deactivation distance. In one embodiment, the low power state may be one of a standby state, a sleep state, or a hibernate state.

Figure 7:
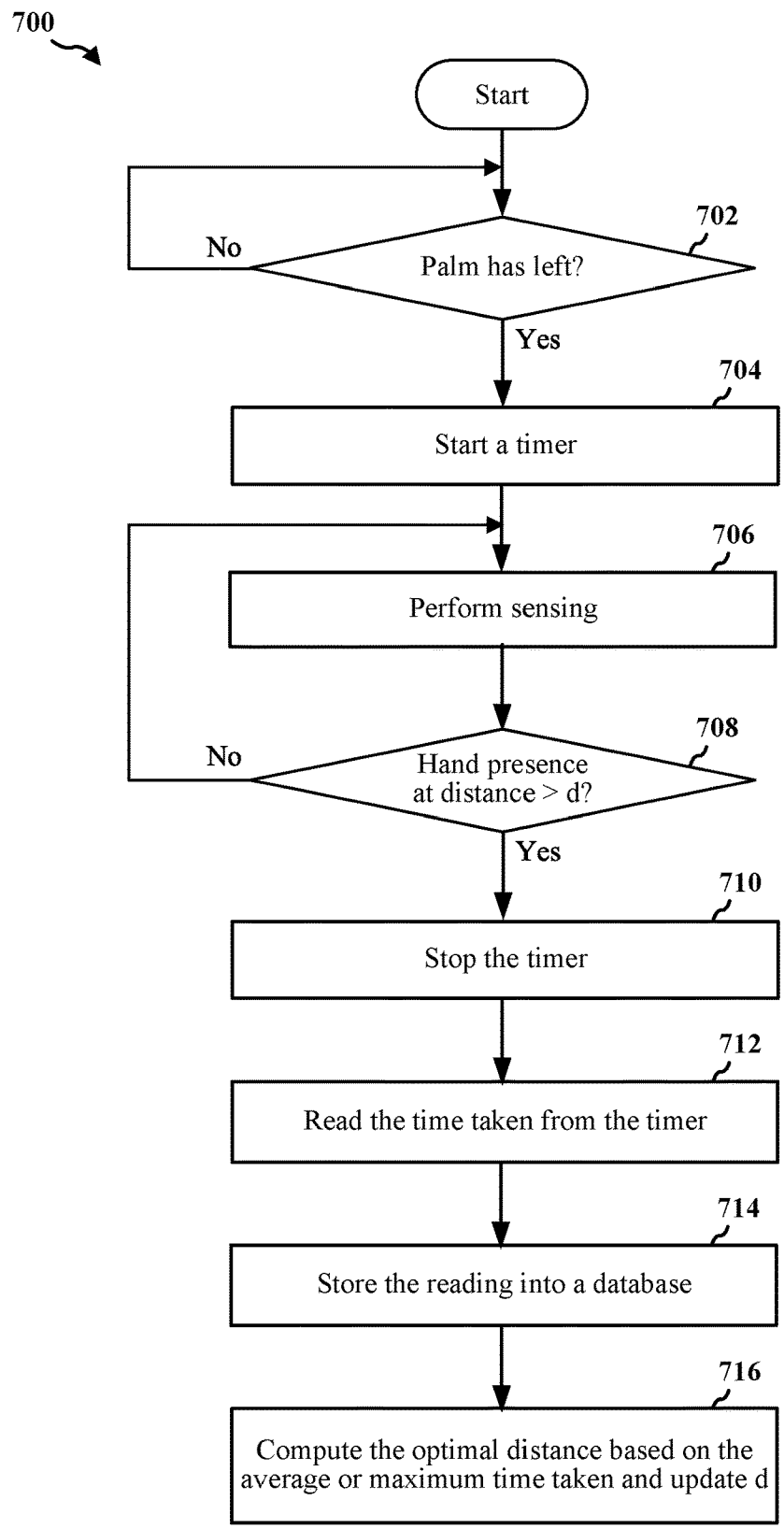
FIG. 7 is a flowchart of a method of adapting the sensing distance for deactivation of the input device.

FIG. 7 is a flowchart 700 of a method of adapting the sensing distance for deactivation of the input device. In one embodiment, the method may be performed by an apparatus (e.g., the apparatus 802/802'). The apparatus may include an input device (e.g., the mouse 100 or the input device 505). In one embodiment, the operations performed in the method may include the operations performed at 602 in FIG. 6.

At 702, the apparatus may determine whether the palm has left the apparatus. If the palm has left, the apparatus may proceed to 704. Otherwise, the apparatus may loop back to 702 to check again.

At 704, the apparatus may start a timer. At 706, the apparatus may perform sensing. At 708, the apparatus may determine whether the hand is detected at a distance that is greater than the sensing distance d. If the hand is detected at such a distance, the apparatus may proceed to 710. Otherwise, the apparatus may loop back to 706 to perform sensing again.

At 710, the apparatus may stop the timer. At 712, the apparatus may read the time taken from the timer. At 714, the apparatus may store the reading of the timer into a database.

At 716, the apparatus may compute the optimal distance based on the average or maximum time taken and update the sensing distance for deactivation d accordingly.

Figure 8:
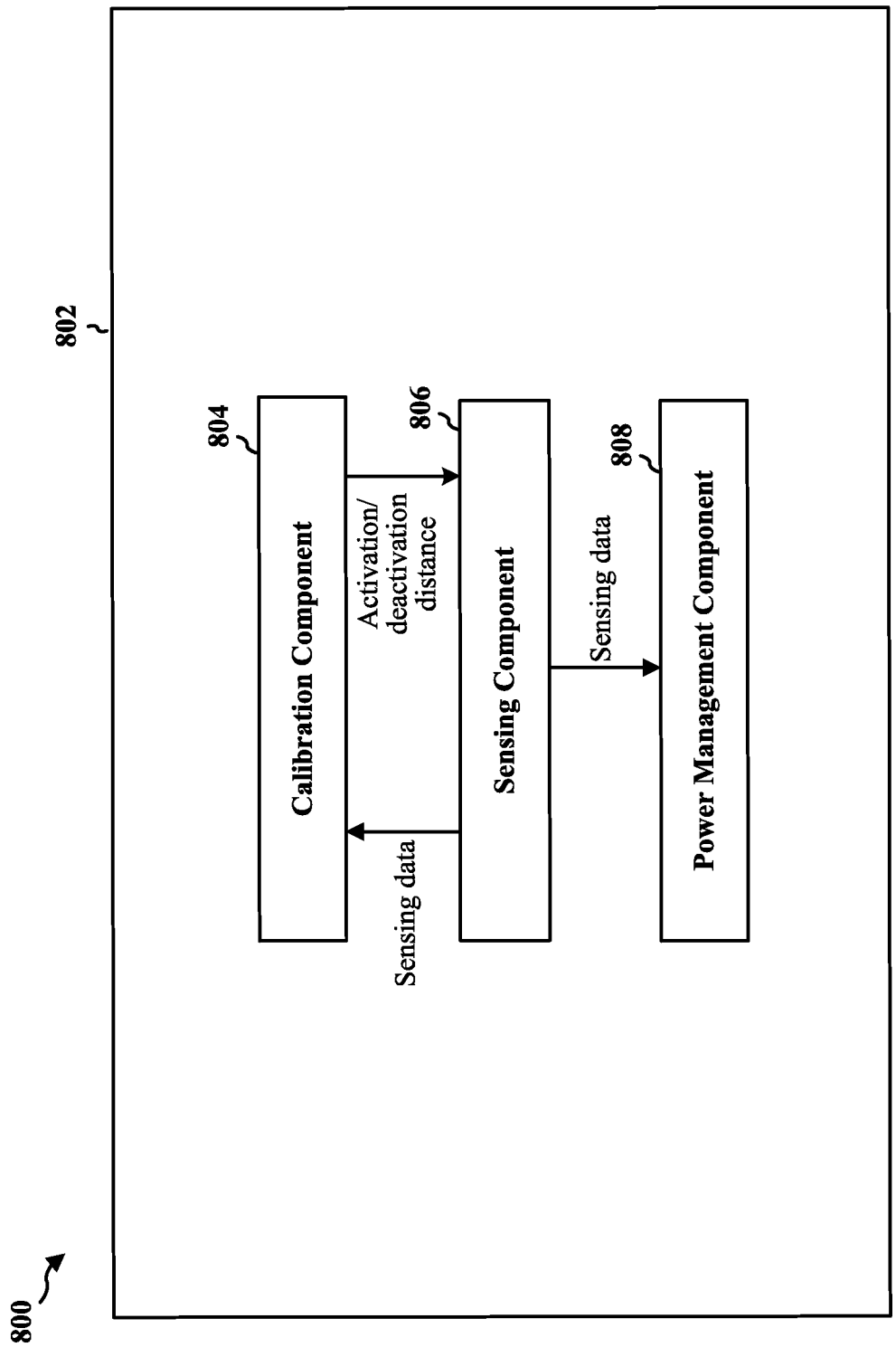
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. In one embodiment, the apparatus 802 may include an input device (e.g., the mouse 100, or the input device 205 or 505).

The apparatus 802 may include a sensing component 806 that senses the presence of approaching or departing operator. In one embodiment, the sensing component 806 may perform the operations described above with reference to 304 in FIG. 3 or 604 in FIG. 6.

The apparatus 802 may include a calibration component 804 that adjusts the sensing distance used by the sensing component 806 for activation or deactivation of the apparatus 802 partially based on past sensing data collected by the sensing component 806. In one embodiment, the calibration component 804 may perform the operations described above with reference to 302 in FIG. 3, 416 in FIG. 4, 602 in FIG. 6, or 716 in FIG. 7.

The apparatus 802 may include a power management component 808 that switch the apparatus 802 between active state and low-power state based on the sensing data received from the sensing component 806. In one embodiment, the power management component 808 may perform the operations described above with reference to 306 in FIG. 3 or 606 in FIG. 6.

The apparatus 802 may include additional components that perform each of the blocks of the algorithm in the aforementioned flowcharts of FIGS. 3, 4, 6, 7. As such, each block in the aforementioned flowcharts of FIGS. 3, 4, 6, 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
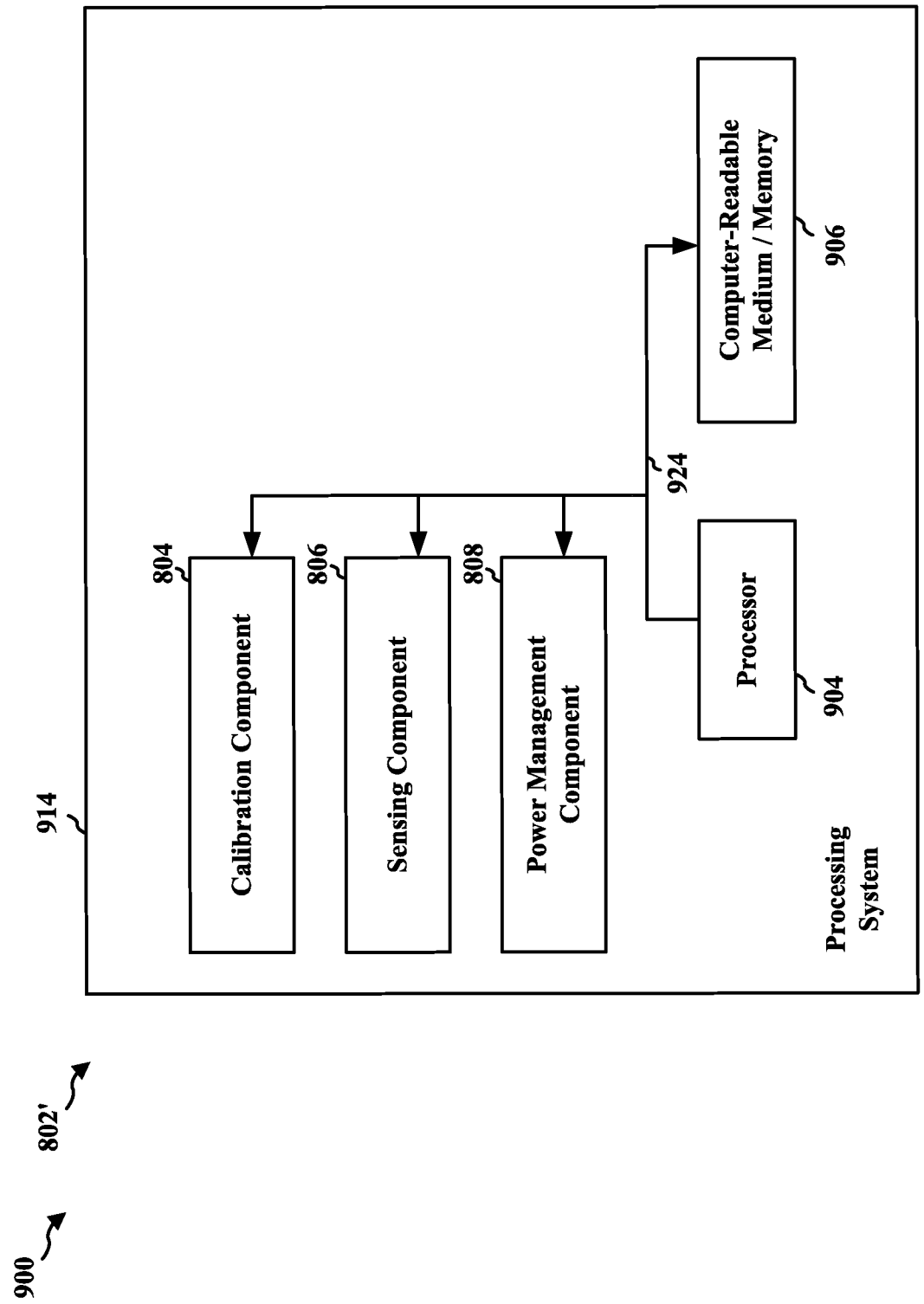
FIG. 9 is a diagram illustrating an example of a hardware implementation for an apparatus employing a processing system.

FIG. 9 is a diagram 900 illustrating an example of a hardware implementation for an apparatus 802' employing a processing system 914. In one embodiment, the apparatus 802' may be the apparatus 802 described above with reference to FIG. 8. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, and the computer-readable medium/memory 906. The bus 924 may also link various other circuits such as timing sources, peripherals, voltage regulators, and power management circuits, which are well known in the art, and therefore, will not be described any further.

The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808. The components may be software components running in the processor 904, resident/stored in the computer readable medium/memory 906, one or more hardware components coupled to the processor 904, or some combination thereof.

In the following, various aspects of this disclosure will be illustrated:

Example 1 is a method or apparatus for power management. The apparatus may determine an activation distance based on operator behavior in relation to operating the apparatus. The apparatus may detect the presence of an approaching object at the activation distance. The apparatus may wake up the input device from a low-power state in response to the detecting of the presence of the approaching object at the activation distance.

In Example 2, the subject matter of Example 1 may optionally include that, to determine the activation distance, the apparatus may: determine the actual activation time for the apparatus based on the operator behavior; and calculate the activation distance based on the actual activation time and a desired activation time.

In Example 3, the subject matter of Example 2 may optionally include that the actual activation time is the time taken from detecting the presence of an approaching operator at a previous activation distance to the time when the approaching operator reaches the apparatus.

In Example 4, the subject matter of Example 3 may optionally include that, to calculate the activation distance, the apparatus may: calculate the speed of operator movement based on the actual activation time and the previous activation distance; and calculate the activation distance based on the speed of operator movement and the desired activation time.

In Example 5, the subject matter of any one of Examples 2 to 4 may optionally include that the desired activation time may be the duration for the apparatus to wake up from the low-power state.

In Example 6, the subject matter of any one of Examples 1 to 5 may optionally include that the apparatus may: determine a deactivation distance based on the operator behavior; detect the presence of a departing operator at the deactivation distance; and enter into the low-power state in response to the detecting of the presence of the departing operator at the deactivation distance.

In Example 7, the subject matter of Example 6 may optionally include that, to determine the deactivation distance, the apparatus may: determine the actual deactivation time for the apparatus based on the operator behavior; and calculate the deactivation distance based on the actual deactivation time and a desired deactivation time.

In Example 8, the subject matter of Example 7 may optionally include that the actual deactivation time is the time taken from the time when a previous departing operator leaves the apparatus to detecting of the presence of the previous departing operator at a previous deactivation distance.

In Example 9, the subject matter of Example 8 may optionally include that, to calculate the deactivation distance, the apparatus may: calculate the speed of operator movement based on the actual deactivation time and the previous deactivation distance; and calculate the deactivation distance based on the speed of operator movement and the desired deactivation time.

A person skilled in the art will appreciate that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of power management, the method comprising:

activating a low-power state of an input device;

determining a new activation distance for waking up the input device from the low-power state when an approaching object, being a part of the operator's human body used to operate the input device, is at the new activation distance;

wherein determining the new activation distance comprises:

determining a plurality of actual activation times, wherein each actual activation time is a respective time taken from detecting a respective presence of the approaching object at a previous activation distance to a respective time when the approaching object reaches the input device, calculating an average value of the plurality of actual activation times, calculating an average speed of operator movement within the previous activation distance based on the average value of the plurality of actual activation times and the previous activation distance, and calculating the new activation distance based on the average speed of operator movement within the previous activation distance and a desired activation time, wherein the desired activation time is a duration for the input device to wake up from the low-power state to a full operational state;

detecting, at the input device, by using a sensor of the input device, a presence of the approaching object at the new activation distance; and waking up the input device from the low-power state in response to the detecting of the presence of the approaching object at the new activation distance.

2. The method of claim 1, further comprising:
activating the full operational state of the input device;
determining a deactivation distance for entering the input device into the low-power state from the full operational state when a departing object is at the deactivation distance;
detecting, at the input device, by using the sensor of the input device, a presence of the departing object at the deactivation distance; and
entering the input device into the low-power state in response to the detecting of the presence of the departing object at the deactivation distance.

3. The method of claim 2, wherein the determining of the deactivation distance comprises:
determining an actual deactivation time for the input device based on the operator behavior; and
calculating the deactivation distance based on the actual deactivation time and a desired deactivation time.

4. The method of claim 3, wherein the actual deactivation time is a time taken from a time when a previous departing object leaves the input device to detecting of a presence of the previous departing object at a previous deactivation distance.

5. The method of claim 4, wherein the calculating of the deactivation distance comprises:
calculating a speed of operator movement based on the actual deactivation time and the previous deactivation distance; and
calculating the deactivation distance based on the speed of operator movement and the desired deactivation time.

6. An apparatus for power management, the apparatus comprising:
a sensor;
a memory; and
at least one processor coupled to the memory and configured to:
activate a low-power state of the apparatus;
determine a new activation distance for waking the apparatus from the low-power state when an approaching object, being a part of the operator's human body used to operate the apparatus, is at the new activation distance;
wherein determining the new activation distance comprises:
determining a plurality of actual activation times, wherein each actual activation time is a respective time taken from detecting a respective presence of the approaching object at a previous activation distance to a respective time when the approaching object reaches the apparatus,
calculating an average value of the plurality of actual activation times,
calculating an average speed of operator movement within the previous activation distance based on the average value of the plurality of actual activation times and the previous activation distance, and
calculating the new activation distance based on the average speed of operator movement within the previous activation distance and a desired activation time, wherein the desired activation time is a duration for the apparatus to wake up from the low-power state to a full operational state;
detect, by using the sensor, a presence of the approaching object at the new activation distance; and
wake up the apparatus from the low-power state in response to the detecting of the presence of the approaching object at the new activation distance.

7. The apparatus of claim 6, wherein the at least one processor is further configured to:
activate the full operational state of the apparatus;
determine a deactivation distance for entering the apparatus into the low-power state from the full operational state when a departing object is at the deactivation distance;
detect, by using the sensor, a presence of the departing object at the deactivation distance; and
entering the apparatus into the low-power state in response to the detecting of the presence of the departing object at the deactivation distance.

8. The apparatus of claim 7, wherein, to determine the deactivation distance, the at least one processor is configured to:
determine an actual deactivation time for the apparatus based on the operator behavior; and
calculate the deactivation distance based on the actual deactivation time and a desired deactivation time.

9. The apparatus of claim 8, wherein the actual deactivation time is a time taken from a time when a previous departing object leaves the apparatus to detecting of a presence of the previous departing object at a previous deactivation distance.

10. The apparatus of claim 9, wherein, to calculate the deactivation distance, the at least one processor is configured to:
calculate a speed of operator movement based on the actual deactivation time and the previous deactivation distance; and
calculate the deactivation distance based on the speed of operator movement and the desired deactivation time.

11. The apparatus of claim 6,
wherein the apparatus is a keyboard or a joystick controller.

12. The apparatus of claim 6,
wherein the apparatus is a mouse.

13. The apparatus of claim 6,
wherein the memory is configured to store a plurality of data indicating the plurality of actual activation times which are used for computation by the at least one processor.

14. A non-transitory computer-readable medium storing computer executable code, comprising instructions for:
activating a low-power state of an input device;
determining a new activation distance for waking up the input device from the low-power state when an approaching object, being a part of the operator's human body used to operate the input device, is at the new activation distance;
wherein determining the new activation distance comprises:
determining a plurality of actual activation times, wherein each actual activation time is a respective time taken from detecting a respective presence of the approaching object at a previous activation distance to a respective time when the approaching object reaches the input device, calculating an average value of the plurality of actual activation times, calculating an average speed of operator movement within the previous activation distance based on the average value of the plurality of actual activation times and the previous activation distance, and calculating the new activation distance based on the average speed of operator movement within the previous activation distance and a desired activation time, wherein the desired activation time is a duration for the input device to wake up from the low-power state to a full operational state;

detecting, at the input device, by using a sensor of the input device, a presence of the approaching object at the new activation distance; and waking up the input device from the low-power state in response to the detecting of the presence of the approaching object at the new activation distance.

15. The non-transitory computer-readable medium of claim 14, further comprising instructions for:

activating the full operational state of the input device;

determining a deactivation distance for entering the input device into the low-power state from the full operational state when a departing object is at the deactivation distance;

detecting, at the input device, by using the sensor of the input device, a presence of the departing object at the deactivation distance; and entering the input device into the low-power state in response to the detecting of the presence of the departing object at the deactivation distance.

16. The non-transitory computer-readable medium of claim 15, wherein the determining of the deactivation distance comprises:

determining an actual deactivation time, wherein the actual deactivation time is a time taken from a time when a previous departing object leaves the input device to detecting of a presence of the previous departing object at a previous deactivation distance;

calculating a speed of operator movement based on the actual deactivation time and the previous deactivation distance; and calculating the deactivation distance based on the speed of operator movement and the desired deactivation time.

* * * * *